United States Patent Office 3,679,641
Patented July 25, 1972

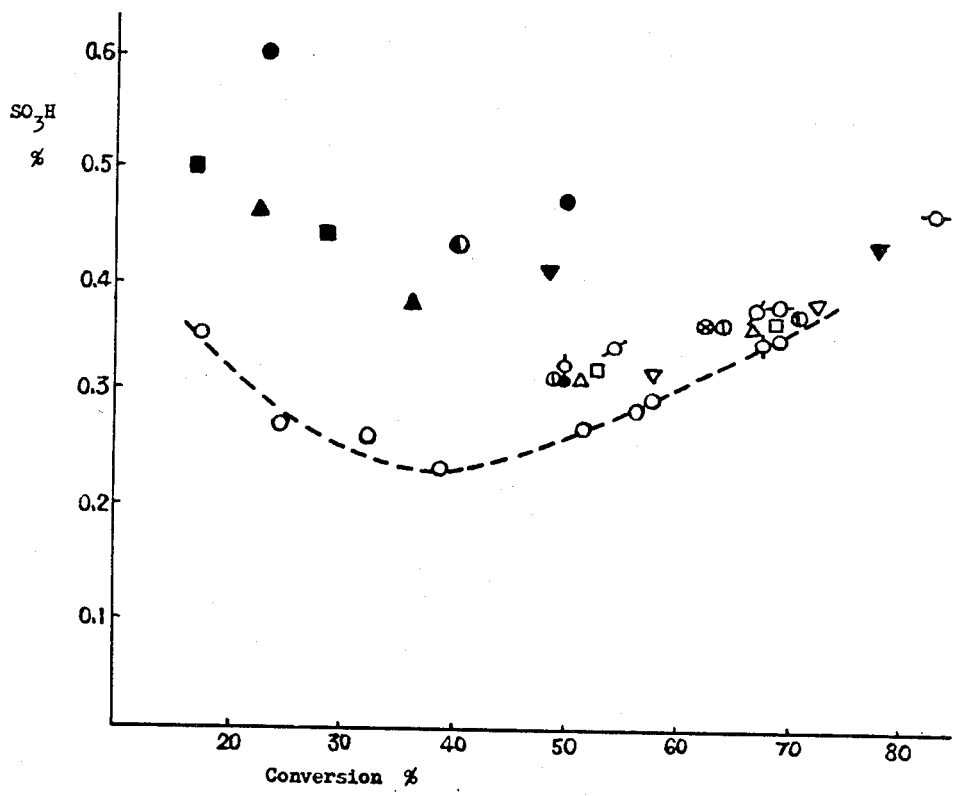

3,679,641
PRODUCTION OF ACRYLONITRILE UNSATURATED SULFONIC ACID COPOLYMERS
Kenji Takeya, Saidaiji, Japan, assignor to Japan Exlan Company Limited, Osaka, Japan
Continuation-in-part of application Ser. No. 672,892, Oct. 4, 1967. This application May 27, 1970, Ser. No. 40,930
Claims priority, application Japan, Oct. 18, 1966, 41/68,756
Int. Cl. C08f 15/02, 15/40
U.S. Cl. 260—79.3 MU       1 Claim

ABSTRACT OF THE DISCLOSURE

Copolymers of at least 80% of acrylonitrile, about 0.1 to 5% of an ethylenically unsaturated organic sulfonic acid or a salt thereof and up to 19.9% of at least one ethylenically unsaturated monomer which is copolymerizable with acrylonitrile and the aforesaid sulfonic acid or its salt, are prepared in aqueous polymerization medium in the presence of an organic compound which is a non-solvent for the copolymer but is a solvent for the monomer(s) other than the sulfonic acid or its salt.

This application is a continuation-in-part of Ser. No. 672,892, filed Oct. 4, 1967, now abandoned.

This invention relates to an improvement in the production of copolymers of acrylonitrile and an unsaturated organic sulfonic acid having an ethylenic double bond (unsaturation) or its water-soluble salt and of acrylonitrile the above mentioned unsaturated organic sulfonic acid or its water-soluble salt and at least one other ethylenically unsaturated compound.

It is already known that, by using such unsaturated organic sulfonic acid having an ethylenic unsaturation as allyl sulfonic acid or its salt as a component of an acrylonitrile copolymer, the affinity for basic dyes of an article (film, fiber, etc.) shaped from the said copolymer is improved. In producing such copolymer, industrially, there has been generally adopted a method wherein monomers are dissolved, emulsified or suspended in an aqueous medium and are copolymerized by using a proper polymerizing catalyst.

A principal object of the present invention is to provide an improved process for producing such acrylonitrile copolymer, whereby said sulfonic acid compound is introduced advantageously into said copolymer.

A further object of the present invention is to obtain an acrylonitrile copolymer having high acceptability to basic dyes.

Other objects of the present invention will become apparent from the following explanation which will be made partly by referring to the accompanying drawing which is a graph showing relation between conversion and SO$_3$H content.

The objects of this invention are accomplished by copolymerizing acrylonitrile and an organic sulfonic acid having an ethylenic unsaturation or its water-soluble salt and, if required, at least one other ethylenic unsaturated compound in an aqueous reaction medium to which is added an organic compound which will not dissolve the resulting copolymer but will dissolve the monomers other than said ethylenic unsaturated sulfonic acid or its water-soluble salt.

It is preferable that the organic compound which does not dissolve the copolymer but is capable of dissolving the monomers other than the ethylenically unsaturated sulfonic monomer is added to the aqueous medium in an amount of 0.03–7.5% based on the weight of water in the aqueous medium, and 0.5–200% by weight based on the total weight of all monomers employed.

The monomeric mixture should contain at least 80% by weight of acrylonitrile and 0.1–5% by weight of an organic sulfonic acid (or its water soluble salt) containing ethylenic unsaturation. If desired, the monomeric mixture may further contain 19.9% or less of one or more other ethylenically unsaturated compounds copolymerizable with acrylonitrile and above mentioned organic sulfonic acid.

The method of this invention may be applied to a batch type process or to a continuous process carried out by continuously adding the monomer mixture and the above mentioned organic compound at a predetermined ratio into the reaction system. Aqueous precipitation polymerization, emulsion polymerization or suspension polymerization may be employed in carrying out the method of this invention.

Suitable polymerization initiators to be used in the process of the present invention are hydrogen peroxide, amonium persulfate, such oxidation-reduction system (redox polymerization initiators) as sodium bisulfite, sodium chlorate and sodium sulfite, and such water-soluble persulfate as potassium persulfate.

The polymerization temperature and pH can be selected suitably. However, it is preferable that the polymerization is conducted at 20–80° C. and under a pH of 1–7.

The unsaturated sulfonic acids having ethylenic unsaturation or their water-soluble salts useful in the present invention can be allyl sulfonic acid, methallyl sulfonic acid, allyloxyethyl sulfonic acid, methallyloxy sulfonic acid, allyloxypropanol sulfonic acid, allylthioethyl sulfonic acid and allylthiopropanol sulfonic acid and such water-soluble salts as potassium salts, sodium salts and ammonium salts thereof.

The ethylenic unsaturated compounds which can be copolymerized with acrylonitrile and the above mentioned ethylenic unsaturated sulfonic acids include such esters of acrylic acid as methyl acrylate, ethyl acrylate, butyl acrylate, octyl acrylate, methoxyethyl acrylate, phenyl acrylate, cyclohexyl acrylate and dimethylaminoethyl acrylate and such esters of methacrylic acid as methyl methacrylate, ethyl methacrylate, butyl methacrylate, octyl methacrylate, methoxyethyl methacrylate, phenyl methacrylate, cyclohexyl methacrylate and dimethyl aminoethyl methacrylate, acrylamides and methacrylamides or their alkyl substituted products and nitrogen substituted products; such unsaturated carboxylic acids as acrylic acid, methacrylic acid and itaconic acid; such unsaturated ketones as methyl vinyl ketone, phenyl vinyl ketone and methyl isopropenyl ketone; such vinyl carboxylates as vinyl formate, vinyl acetate, vinyl propionate, vinyl thiolacetate and vinyl benzoate; esters of such ethylene alpha beta carboxylic acids as maleic acid, fumaric acid, citraconic acid, mesaconic acid and aconitic acid; styrene and its alkyl substituted products; allyl alcohol; vinyl chloride; vinylidene chloride; vinylidene cyanide; methacrylonitrile; alpha methylene glutaronitrile.

For the organic compounds added to the polymerization system according to this invention are those organic compounds which will not dissolve the copolymer but will dissolve the other monomers than the ethylenic unsaturated sulfonic monomer and its water-soluble salt and will be high in the effect of reducing the surface tension of the aqueous solution when added. Examples of such organic compounds are such alcohols as propyl alcohol, isopropyl alcohol, butyl alcohol, isobutyl alcohol, sec-butyl alcohol, isoamyl alcohol and hexyl alcohol, such esters are ethyl acetate, amyl acetate and methyl propionate and such ketones as methylethyl ketone, diethyl ketone and cyclohexanone.

The fibers, films, sheets, tubes and other shaped articles made of acrylonitrile copolymer or a mixture of such copolymers obtained by the process of the present invention are high in the basic dye acceptability.

$SO_3Na$ in the copolymer to $SO_3H$ by using an ion exchange resin. The results are shown in Table 1. Further, in Table 1 are also set forth the results of measuring with Du Nouy's surface tension meter the surface tension of an aqueous solution prepared by adding an organic compound in case no monomer was present.

TABLE 1

| Organic compound | | Polymerization time (minutes) | Conversion (percent) | Molecular weight | Content of $SO_3H$ in the copolymer percent | Surface tension of the aqueous solution (dynes/cm.) |
| --- | --- | --- | --- | --- | --- | --- |
| Kind | Amount of addition (parts) | | | | | |
| Methyl propionate | 10 | 40 | 49.5 | 58,100 | 0.31 | 65 |
|  |  | 120 | 63.9 | 54,900 | 0.36 |  |
| Do | 50 | 40 | 40.6 | 52,900 | 0.43 | 49 |
|  |  | 120 | 71.1 | 55,100 | 0.37 |  |
| Do | 100 | 40 | 23.9 | 36,500 | 0.60 | 41 |
|  |  | 120 | 50.1 | 46,900 | 0.47 |  |
| n-Propyl alcohol | 10 | 40 | 51.3 | 56,300 | 0.31 | 66 |
|  |  | 120 | 66.9 | 54,300 | 0.36 |  |
| Do | 100 | 40 | 22.5 | 38,400 | 0.46 | 44.5 |
|  |  | 120 | 36.5 | 45,400 | 0.38 |  |
| n-Butyl alcohol | 10 | 40 | 53.1 | 54,000 | 0.52 | 60 |
|  |  | 120 | 68.7 | 51,400 | 0.36 |  |
| Do | 100 | 40 | 17.7 | 31,500 | 0.50 | 32 |
|  |  | 120 | 28.5 | 34,200 | 0.44 |  |
| Ethyl acetate | 10 | 40 | 49.3 | 58,600 | 0.31 | 65 |
|  |  | 120 | 62.6 | 55,300 | 0.36 |  |
| Isoamyl alcohol | 10 | 40 | 54.8 | 53,800 | 0.34 | 48 |
|  |  | 120 | 67.3 | 51,500 | 0.37 |  |
| Methyl ethyl ketone | 10 | 40 | 58.6 | 55,300 | 0.32 | 65 |
|  |  | 120 | 72.4 | 49,500 | 0.38 |  |
| Do | 100 | 40 | 48.5 | 45,200 | 0.41 | 48 |
|  |  | 120 | 78.7 | 44,100 | 0.43 |  |
| Cyclohexanone | 10 | 40 | 69.4 | 50,100 | 0.38 | 64 |
|  |  | 120 | 83.0 | 47,000 | 0.46 |  |
| n-Hexyl alcohol | 5 | 40 | 49.6 | 54,100 | 0.32 | 35 |
|  |  | 120 | 67.8 | 32,500 | 0.34 |  |

Thus, the only important feature of this invention is to add the particular organic compound to the aqueous polymerization system. Except this respect, the polymerization may be conducted in the usual manner well known in the art of the formation of acrylonitrile copolymers in an aqueous medium.

The present invention will be explained more particularly with reference to the following typical examples in which parts and percentages are by weight unless otherwise specified.

EXAMPLE 1

In a glass flask provided with a stirrer, reflux condenser, thermometer, nitrogen gas inlet pipe, dropping funnel and sampling tube, 1400 parts of pure water, 90.4 part of acrylonitrile, 9.6 parts of methyl acrylate, 2 parts of sodium methallyl sulfonate, 2 parts of nitric acid and in each of a plurality of runs, one of the organic compounds shown in Table 1 were charged. The mixture was stirred, mixed and dissolved, the upper atmosphere was replaced with nitrogen gas, the temperature of the polymerizing reaction system was kept at 45° C., 16.35 parts of ferrous sulfate $FeSO_4 \cdot 7H_2O$ and 2 parts of hydrogen peroxide (as calculated to be pure) were added thereto and the polymerizing reaction was continued while stirring. In sampling the polymerization solution in the flask, the polymerization solution was taken into an aqueous solution of hydroquinone, separated by filtration on a glass filter, washed with water, then washed with a dilute aqueous solution of hydrochloric acid, further washed with water and was then dried. Further, the amount of pure charge water corresponding to the amount of addition of the organic compound shown in Table 1 was reduced so that the monomer concentration and the polymerization initiator concentration in the polymerizing reaction system before the starting of the polymerizing reaction is constant. In 40 and 120 minutes of the polymerization time, the polymerization solution was sampled. The conversion, molecular weight and the $SO_3H$ content in the copolymer were measured. The molecular weight of the copolymer was calculated by using Staudinger's formula from the viscosity measurement. The content of $SO_3H$ in the copolymer was measured by electric conductivity titration with an ethanol solution of sodium hydroxide, after dissolving the copolymer in dimethyl formamide, converting all On the other hand, when the copolymerization was carried out under the same conditions as in the above except that no organic compound was added, the content of $SO_3H$ in the copolymer was comparatively high in the initial period of the polymerization but reduced once with the rise of the conversion and then tended to gradually increase, as shown in Table 2.

TABLE 2

| Polymerization time (min.) | Conversion (percent) | Contents of $SO_3H$ in the copolymer (percent) | Molecular weight | Surface tension of the aqueous solution (dynes/cm.) |
| --- | --- | --- | --- | --- |
| 5 | 17.7 | 0.35 | 27,500 | 73 |
| 10 | 24.7 | 0.27 | 38,700 |  |
| 15 | 32.6 | 0.26 | 48,600 |  |
| 20 | 38.7 | 0.23 | 53,800 |  |
| 40 | 51.7 | 0.26 | 55,700 |  |
| 60 | 56.6 | 0.28 | 54,700 |  |
| 90 | 58.0 | 0.29 | 53,700 |  |
| 150 | 69.2 | 0.35 | 53,600 |  |

In order to compare the relations of the $SO_3H$ content and the conversion, the values in Table 1 and 2 were plotted in FIG. 1. As shown in FIG. 1, when the organic compound was added, the introduction of the $SO_3H$ into the copolymer increased. That is to say, it is evident that sodium methallyl sulfonate was introduced advantageously. Specifically, it is shown that the larger the amount of addition of the organic compound and the higher the effect of the reduction of the surface tension of the aqueous solution by the addition of the organic compound, the more advantageous the introduction of the $SO_3H$ radical or sodium methallyl sulfonate into the copolymer.

EXAMPLE 2

A continuous polymerizing reaction tank provided with a stirring device having a fixed number of revolutions was maintained at 45° C. by the jacket tube. Proper amounts of the monomers, organic compound, polymerization initiator, nitric acid and water were continuously fed into the polymerizing reaction tank. On the other hand, the reaction product was continuously taken out. Thus, there were used 90.4 parts of acrylonitrile, 9.6 parts of methyl acrylate and 0.756 part of sodium methallyl sufonate as monomers, methyl propionate as an organic compound in an amount as shown in Table 3 per 100 parts of mixture of acrylonitrile and methyl acrylate.

There was also added a redox catalyst system consisting of sodium chlorate and sodium sulfite as a polymerization initiator in which the amount of chlorate was as shown in Table 3 and sodium sulfite was 8 mols per mol of sodium chlorate. There was further added 0.09 mol of nitric acid per mol of sodium sulfite in order to maintain the acidic pH of the polymerizing reaction system. The values of dye numbers are shown in Table 3 as comparative values representing the polymerization rate, average molecular weight and the dyeability of the copolymer with basic dyes.

TABLE 3

| Amount of addition of methyl propionate (parts) | Amount of addition of sodium chlorate (parts) | Conversion (Percent) | Molecular weight | Dye No. | Surface tension of the aqueous solution (dynes/cm.) |
|---|---|---|---|---|---|
| 0 | 0.275 | 77.6 | 74,000 | 6.7 | 49.8 |
| 2.5 | 0.30 | 79.0 | 71,600 | 7.0 | 48.0 |
| 5 | 0.315 | 78.3 | 72,300 | 7.0 | 48.0 |
| 7.5 | 0.31 | 74.9 | 74,000 | 7.2 | 47.0 |
| 10 | 0.30 | 71.1 | 73,500 | 7.3 | 45.9 |

The result of measuring the surface tension at 20° C. in case methyl propionate was added in the same quantity as in Table 3 to the aqueous solution of monomer concentration of 6% at the mixing ratio of the monomers used in this example is also set forth in Table 3.

From the results shown in Table 3, it is apparent that, with the increase in the amount of addition of methyl propionate, the surface tension of the aqueous solution reduced, the dye number rose and the dyeability with basic dyes increased.

The dye number as cited here is a comparative value determined by dyeing the copolymer with a basic dye of C.I. Basic Blue 5G until it was well saturated, washing it with water, then dissolving the dyed copolymer in γ-butyrolactone so as to be a solution of a concentration of 0.2 g./100 cc. and measuring an extinction of 600 mµ by the colorimetry of the dyed copolymer solution. It is shown that, the higher the value, the higher the dyeability with the basic dye. "C.I." means Colour Index, 2nd edition, 1956 and Supplement, 1963 published by The Society of Dyers and Colourists, Bradford England and The American Association of Textile Chemists and Colorists, Lowell, Mass., U.S.A.

EXAMPLE 3

A glass flask fitted with a stirrer, reflux condenser, thermometer, nitrogen gas inlet, dropping funnel and sampling tube was charged with 1400 parts of pure water, 95 parts of acrylonitrile, 5 parts of vinyl acetate, 2 parts of sodium allyl sulfonate, 2 parts of nitric acid and the organic compound shown in Table 4. The mixture was stirred and dissolved, and the upper space in the flask was replaced by nitrogen gas. There were further added 16.35 parts of ferrous sulfate (FeSO$_4$·7H$_2$O) and 2 parts of hydrogen peroxide (as pure), and the mixture was stirred at 45° C. to bring about the polymerization. Corresponding to the amount of the organic compound shown in Table 4 the amount of pure water was adjusted so that the concentrations of the monomers and polymerization initiator were constant in any case before starting the polymerization. After 120 minutes the product was taken, conversion, molecular weight and SO$_3$H content in the copolymer were measured in the same manner as in Example 1.

The results are shown in FIG. 4, from which it will be clear that, by addition of the organic compound according to the invention, the introduction of SO$_3$H group in the copolymer is increased.

TABLE 4

| Kind | Amount, parts | Conversion (Percent) | Molecular weight | SO$_3$H content (percent) in copolymer |
|---|---|---|---|---|
| n-Propylalcohol | 1.0 | 63.7 | 57,000 | 0.142 |
| Do | 5.0 | 60.9 | 56,000 | 0.134 |
| n-Butylalcohol | 0.5 | 67.8 | 55,300 | 0.142 |
| Do | 1.0 | 61.5 | 57,600 | 0.141 |
| None | | 62.6 | 53,400 | 0.129 |

EXAMPLE 4

In the same manner as in Example 3, 100 parts of acrylonitrile, 2 parts of sodium methallyl sulfonate and an amount shown in Table 5 of n-butyl alcohol were copolymerized. The results are shown in Table 5, from which it will be clear that sodium methallyl sulfonate can be advantageously introduced in the copolymer when n-butyl alcohol is present in the aqueous polymerization system.

TABLE 5

| Amount of n-butyl alcohol (part) | Conversion (percent) | Molecular weight | SO$_3$H content (percent) in copolymer |
|---|---|---|---|
| 0 | 63.9 | 46,100 | 0.408 |
| 5 | 56.7 | 48,000 | 0.421 |

What I claim is:

1. In a method of producing an acrylonitrile copolymer which consists essentially of copolymerizing at least 80% by weight of acrylonitrile, 0.1–5% by weight of an organic sulfonic acid selected from the group consisting of allyl sulfonic acid, methallyl sulfonic acid, allyloxyethyl sulfonic acid, methallyloxy sulfonic acid, allyloxypropanol sulfonic acid, allylthioethyl sulfonic acid, allylthiopropanol sulfonic acid and water-soluble salts thereof and 0–19.9% by weight of at least one ethylenically unsaturated monomer copolymerizable with acrylonitrile and the sulfonic acid or water-soluble salt thereof in an aqueous polymerization medium containing a polymerization initiator, the improvement according to which the polymerization medium also contains approximately 0.03–7.5%, based on the weight of water, and 0.5–200%, based on the weight of the total monomers, of an organic compound selected from the group consisting of propyl alcohol, isopropyl alcohol, butyl alcohol, isobutyl alcohol, sec-butyl alcohol, isoamyl alcohol, hexyl alcohol, ethyl acetate, amyl acetate, methyl propionate, methylethyl ketone, diethyl ketone and cyclohexanone which does not dissolve the acrylonitrile copolymer but is capable of dissolving the monomers other than the organic sulfonic acid or its water-soluble salt.

References Cited

UNITED STATES PATENTS

| 2,699,433 | 1/1955 | Green | 260—30.2 |
| 3,020,265 | 2/1962 | Tietz | 260—79.3 M |
| 3,260,707 | 7/1966 | Caldwell | 260—79.3 M |
| 3,431,244 | 3/1969 | Brealey | 260—78.5 |
| 3,055,876 | 9/1962 | Grotz | 260—87.1 |

JOSEPH L. SCHOFER, Primary Examiner

C. A. HENDERSON, JR., Assistant Examiner

U.S. Cl. X.R.

260—29.6 AN, 63 R, 78.5 R